United States Patent [19]

Jang

[11] Patent Number: 5,392,141

[45] Date of Patent: Feb. 21, 1995

[54] MULTI-LAYERED LIQUID CRYSTAL DEVICE HAVING COLUMNS SUPPORTING INSULATING LAYERS THEREBETWEEN AND METHOD OF PRODUCTION

[75] Inventor: In-sik Jang, Songtan, Rep. of Korea

[73] Assignee: Samsung Electronics Co., Ltd., Kyungki-do, Rep. of Korea

[21] Appl. No.: 169,243

[22] Filed: Dec. 20, 1993

[30] Foreign Application Priority Data

Dec. 26, 1992 [KR] Rep. of Korea .............. 1992-25631

[51] Int. Cl.$^6$ ................ G02F 1/133; G02F 1/1335; G02F 1/1333
[52] U.S. Cl. ........................ 359/53; 359/62; 359/79
[58] Field of Search ............ 359/53, 62, 79, 81, 359/51

[56] References Cited

U.S. PATENT DOCUMENTS

| | | | |
|---|---|---|---|
| 3,886,014 | 5/1975 | Bayer | 156/145 |
| 4,581,608 | 4/1986 | Aftergut et al. | 340/704 |
| 4,659,182 | 4/1987 | Aizawa | 350/339 F |
| 4,813,770 | 3/1989 | Clerc et al. | 350/347 E |
| 4,878,741 | 11/1989 | Fergason | 350/339 F |
| 5,113,272 | 5/1992 | Reamey | 359/53 |

Primary Examiner—Anita Pellman Gross
Assistant Examiner—Charles Miller
Attorney, Agent, or Firm—Robert A. Westerlund; Stephen R. Whitt; Charles R. Donohoe

[57] ABSTRACT

A liquid crystal display device having a multilayer structure includes at least one substrate, first electrodes arranged on the substrate into a predetermined pattern for constituting a plurality of pixels and second electrodes arranged across from the first electrode by a predetermined interval therebetween, liquid crystal layers filling the gap between the electrodes, at least one insulation layer arranged between the liquid crystal layers for separating the liquid crystal layers into a multiple lamination structure, columns having protrusions extending radially and outwardly between the upper and lower insulation layers at each vertical level of outer walls for securing the insulation layer within the liquid crystal layer, and protective insulation layers for protecting the first and second electrodes. Therefore, contact strength between columns and insulation layers can be significantly enforced so that the columns and insulation layers can avoid becoming separated from each other, and insulation layers can be stably maintained.

5 Claims, 8 Drawing Sheets

MULTI-LAYERED LIQUID CRYSTAL DEVICE HAVING COLUMNS SUPPORTING INSULATING LAYERS THEREBETWEEN AND METHOD OF PRODUCTION

BACKGROUND OF THE INVENTION

The present invention relates to a liquid crystal display (LCD) device for use in the optical display and the manufacturing method therefor, and more particularly, to an LCD device for strengthening the support structure of the insulation layer partitioning the liquid crystal layer and the manufacturing method therefor.

The liquid crystal display (LCD) device can operate by relatively low driving voltages, so as to conserve a little electric power. Also, it is thin and has a simple structure like a plasma display panel or electrical field light emitting effect device. Therefore, LCD devices have made significant advances in development as a picture display device in a wide variety of diversified fields, and the expansion of applications is continuing.

Since a currently utilized liquid crystal display device of an active matrix type using a simple X-Y matrix or thin-film transistor (TFT) is a twisted nematic (TN) type or super-twisted nematic (STN) type, a polarized plate for controlling light is required. However, the polarized plate in the LCD intercepts more than 50% of the emitted light while controlling the light polarization. Accordingly, efficiency in the use of light is reduced.

For this reason, a background light source having a considerable brightness is required to obtain an image having a desired brightness. Thus, in the case of a laptop wordprocessor or computer which uses a dry cell battery or an accumulative battery cell as a power supply source, extended use is limited due to the excessive power consumption of the background light source.

Also, in the general LCD including the TN and STN liquid crystals, since liquid crystal is filled between two glass plates, it is necessary for a cell gap which is a light-controlled area to be strictly adjusted in order to form a uniform picture image. However, due to current technological limitations in the manufacturing of the glass plate, the super-enlarging of an LCD panel is difficult to achieve.

Taking the above-described problems into consideration, it is necessary to decrease the burden of cell gap adjustment by enhancing the efficiency of the use of light with the removal of the polarizing panels and using a pair of substrates.

Examples of the conventional liquid display devices not using the polarized plate, include a cholesteric nematic transition (CNT) type which uses a phase transition effect and a dynamic scattering mode (DSM) type which was devised during early LCD development. The DSM type LCD exhibits a slow response time and is thicker than other LCD devices, so that it is no longer in common use.

Also, another example of an LCD not using a polarized plate to increase the efficiency of light is a polymer-dispersed liquid crystal display (PDLCD). However, since the PDLCD is made of a polymer material more than half of whose volume is light-transmitting, the scattering of light should be enough brought about to obtain a clear contrast. To attain these requirements, there is a structural limitation in that the thickness of the liquid crystal layer should be at least 20 $\mu$m.

An LCD which adopts an electrical field effect type liquid crystal having a new structure in which the above conventional problems of the LCD are considerably improved, was filed on May 8, 1992 as Japanese patent application No. hei 4-116146 of which the corresponding U.S. patent application was filed on May 10, 1993. A continuation-in-part application of the above U.S. patent application has been filed on Aug. 24, 1993 (whose serial number has yet to be delivered).

The above LCD has a fast driving speed and high light-utilization efficiency, in which the liquid crystal layer provided between the opposing electrodes is isolated by a plurality of insulation layers to form a multilayer structure, the polarized plate is not used and only a single sheet of a glass substrate is applied. Here, a function layer for controlling the light is formed by deposition on the top of the resultant.

That is, as shown in FIG. 1, field effect type liquid crystal layers 22 are arranged between two opposing electrodes 10 and 18 the interval of which is maintained by the support of the columns 12. Also, insulation layers 20 are arranged for separating liquid crystal layers 22 into multiple layers. Insulation layers 20 are fixed with respect to one another by means of columns 12 which are locally arranged, and has inlet holes 14 for locally injecting the liquid crystal. Here, the thickness of each layer of liquid crystal layers 22 is less than 3 $\mu$m, and the thickness of each insulation layer is less than 5 $\mu$m. Here, epoxy resin can be used as a material for insulation layer 20. However, metal oxides, more particularly an aluminum oxide, can be used instead.

A method for manufacturing the above-constructed liquid crystal display device will be described hereinafter.

Referring to FIG. 5, a conductive material is deposited on the surface of a black plastic substrate 16, so as to form a predetermined pattern of the lower electrode 18.

Referring to FIG. 6, firstly, on the surface of the substrate, epoxy resin layer 20 and polyvinyl alcohol (PVA) layer 22a are repetitively deposited using a spin coating method or roll coating method. Next, on the topmost epoxy resin layer 20, an indium tin oxide (ITO) is deposited to thereby form a predetermined pattern of the upper electrode 10.

Referring to FIG. 7, a photomask pattern is formed on upper electrode 10 so as to leave a photoresist 24.

Referring to FIG. 8, the portions which are not covered with photoresist 24 are plasma-etched to thereby form wells for forming columns 12. Next, the epoxy resin fills the cavities and is coated on the surface of the lamination structure, so that columns 12 and surface epoxy resin layer 26 are formed.

Referring to FIG. 9, liquid crystal inlet holes 14 are formed by the use of a photomask pattern and plasma etching. Here, water is supplied through inlet holes 14 so that it dissolves and removes all of PVA layers 22a between the insulation layers. Accordingly, the dissolution layer connected to inlet holes 14 is removed, to thereby form cavities 22b which would be filled up with the crystal liquid. At this point, each epoxy resin layer 20 maintains a vertical interval by columns 12 (as shown in FIG. 8) so that cavities 22b are sustained.

Referring to FIG. 10, in a vacuum state, the liquid crystal is spread on all the lamination structure which is previously dried, so that it inflows along the cavities 22b through inlet holes 14 to form a liquid crystal layer 22. Upon the completion of the filling of the liquid crystal, the epoxy resin is coated on the whole surface of the topmost insulation layer so as to seal off inlet holes 14 through which the liquid crystal is injected. Where the blockage of light is necessary, a blinding plate 11 is formed on columns 12 and inlet holes 14 so that a reflective type LCD as shown in FIGS. 1 through 4 is manufactured.

The above-described manufacturing method is restricted wherein a water-soluble PVA is used as the material for dissolution layer for ensuring the cavities in which the liquid crystal is filled up, and an epoxy resin is used as the material for the insulation layer. However, a metal, e.g., aluminum, can be used instead of the water-soluble PVA and a metal oxide can be used instead of the epoxy resin.

When the LCD devices are manufactured according to the above processes, the support structure for the insulation layer using the columns is weak, which makes it difficult to obtain a high quality liquid crystal layer. This is because regardless of how the wells are formed or how the resin is then filled up for forming the columns, the contact plane between the column resin and the insulation layer is thin and is incomplete at some portions so as to be easily separated from each other.

SUMMARY OF THE INVENTION

To solve the above-described problems, it is an object of the present invention to provide a liquid crystal display the support structure for insulation layers of which is strengthened with the aid of columns.

Also, it is another object of the present invention to provide a liquid crystal display device having a homogeneous and stable liquid crystal layer for realizing an improved picture and the manufacturing method therefor.

To accomplish the above object, the present invention provides a liquid crystal display device comprising at least one substrate, a plurality of first electrodes arranged on the substrate into a predetermined pattern for constituting a plurality of pixels, a plurality of second electrodes oppositely arranged across from the first electrode by a predetermined interval therebetween, liquid crystal layers filling the gap between the first and second electrodes, a plurality of insulation layers arranged between the liquid crystal layers for separating the liquid crystal layers into a multiple lamination structure, columns having protrusions extending between the upper and lower insulation layers at each vertical level of the outer walls to which the liquid crystal layers correspond, and securing the insulation layer within the liquid crystal layer, and protective insulation layers for protecting the first and second electrodes.

To accomplish the other object, the present invention provides a method for manufacturing a liquid crystal display device, the method comprising the steps of:

depositing a conductive material on a substrate to thereby form a plurality of first electrodes into a predetermined pattern;

alternately depositing a predetermined number of times an insulation layer which is insoluble in a predetermined solvent and a dissolution layer which is soluble in the predetermined solvent, on the first electrodes;

forming wells for columns extending from the top of the laminated structure to the dissolution layer of the bottom:

injecting an etchant through the wells for forming columns and removing parts of the dissolution layers near the wells, to thereby form the wells so as to have uneven inner walls;

filling the uneven wells for forming columns with an epoxy resin to thereby form columns;

forming on the surface of the topmost insulation layer a plurality of second electrodes corresponding to the first electrodes;

forming liquid crystal inlet holes where the columns are not formed;

providing the liquid crystal inlet holes with a solvent to thereby dissolve and remove the dissolution layers; and filling the thus-formed cavities with the liquid crystal.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

Figure 1:
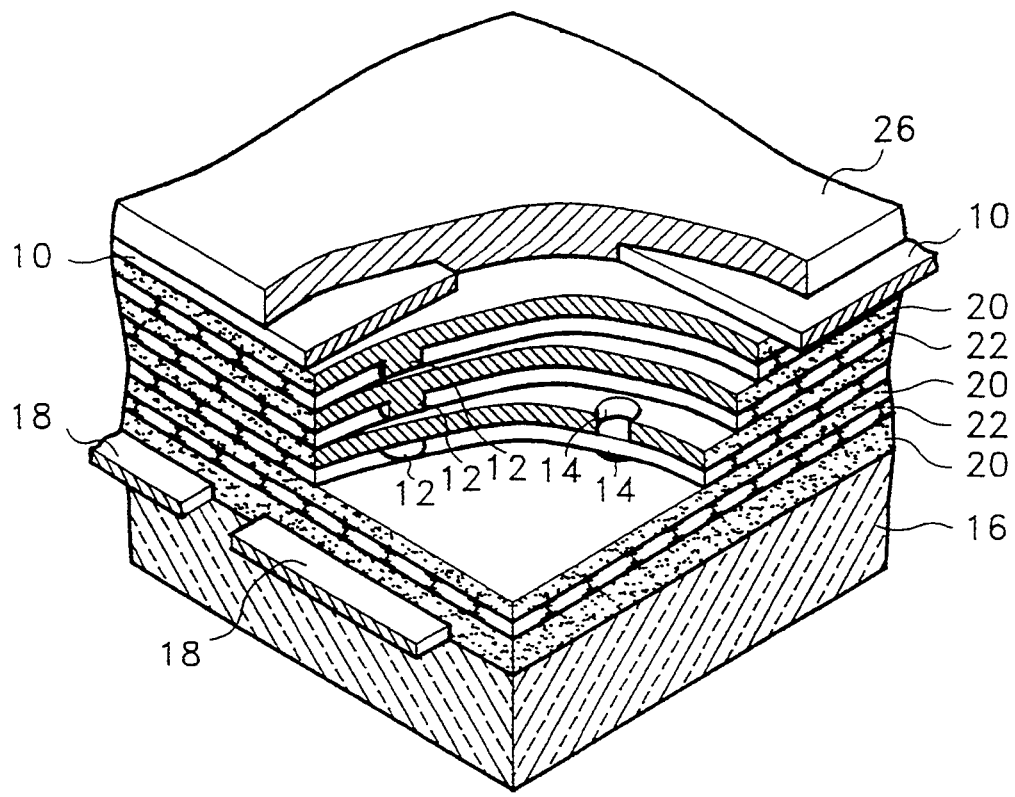
FIG. 1 is a schematic perspective view of the reflective type liquid crystal display device disclosed in U.S. patent application No. 058,712 (which is a corresponding application of the Japanese patent application No. hei 46-116146)
Figure 2:
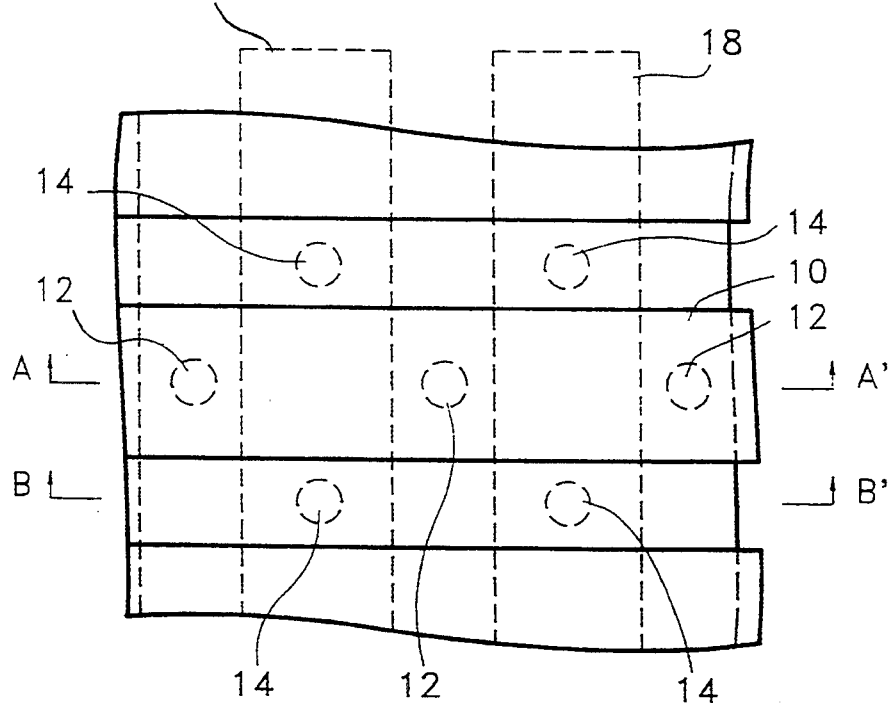
FIG. 2 is a partly exploded plan view of the reflective liquid crystal display device of FIG. 1.
Figure 3:
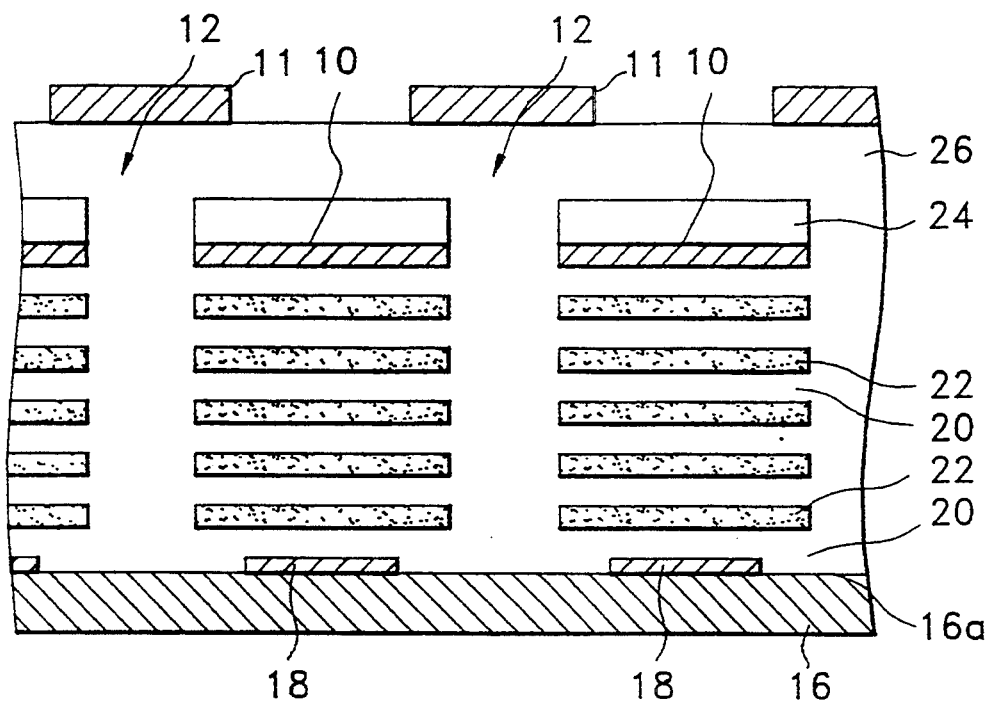
FIG. 3 is a sectional view of the reflective liquid crystal display device cut along line A—A' of FIG. 1.
Figure 4:
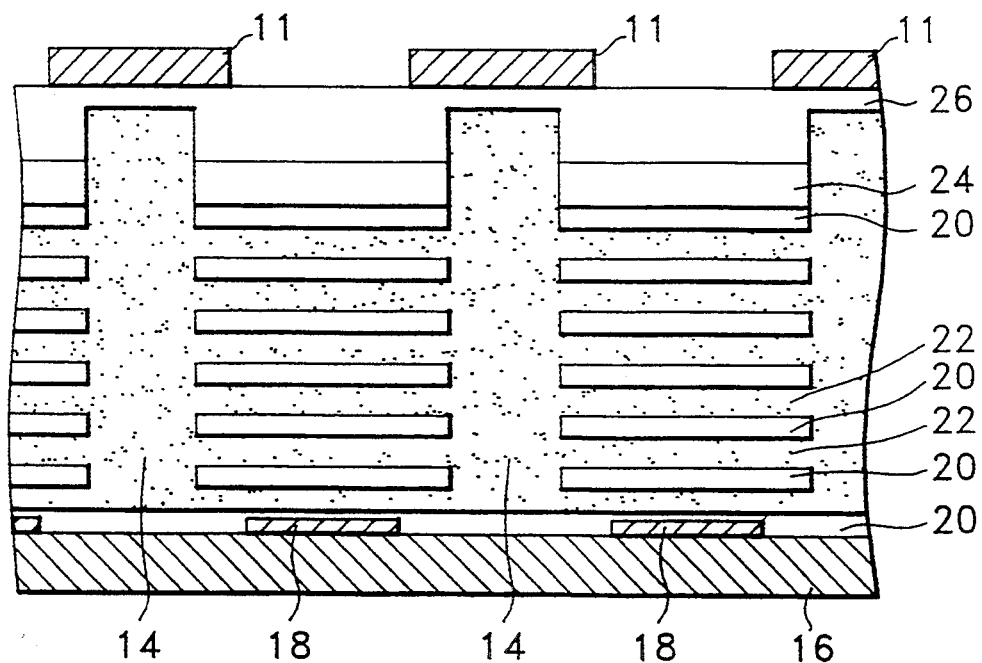
FIG. 4 is a sectional view of the reflective liquid crystal display device along line B—B' of FIG. 1.
Figure 5:
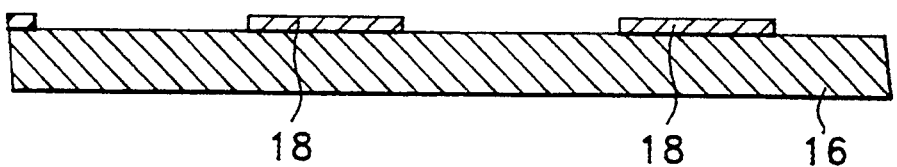
FIGS. 5 through 10 show each step for manufacturing the reflective liquid crystal display device shown in FIG. 1, respectively.
Figure 6:
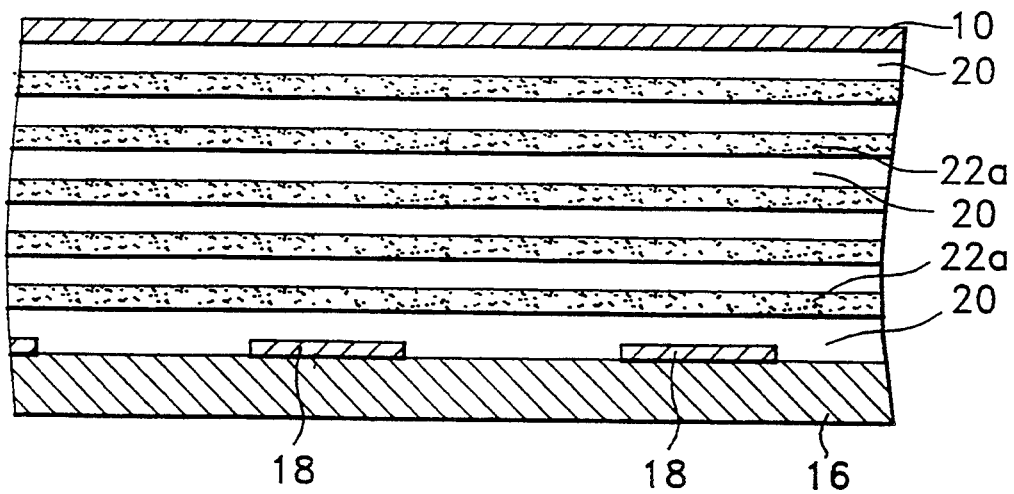
Figure 7:
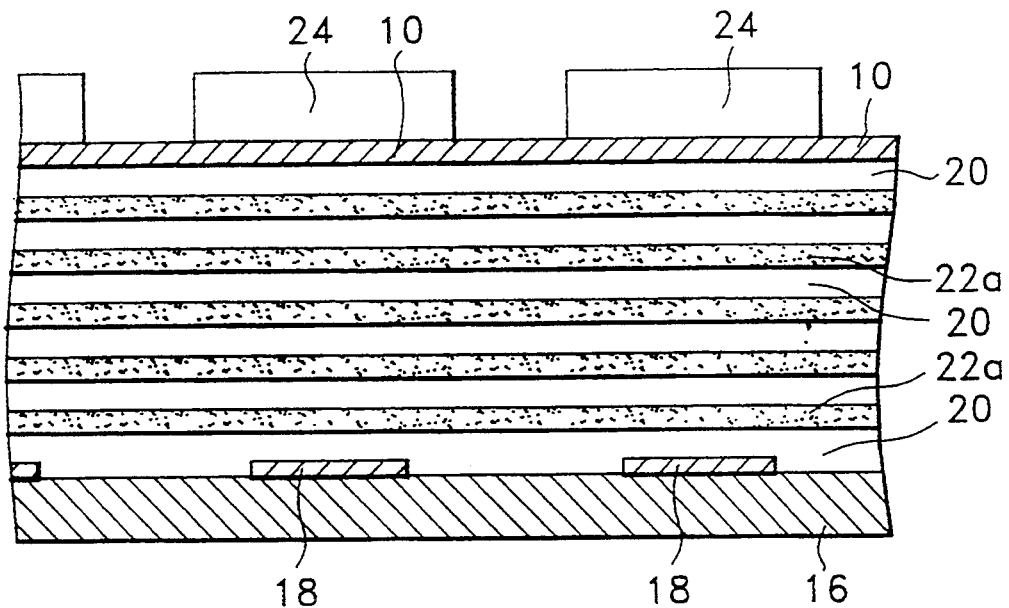
Figure 8:
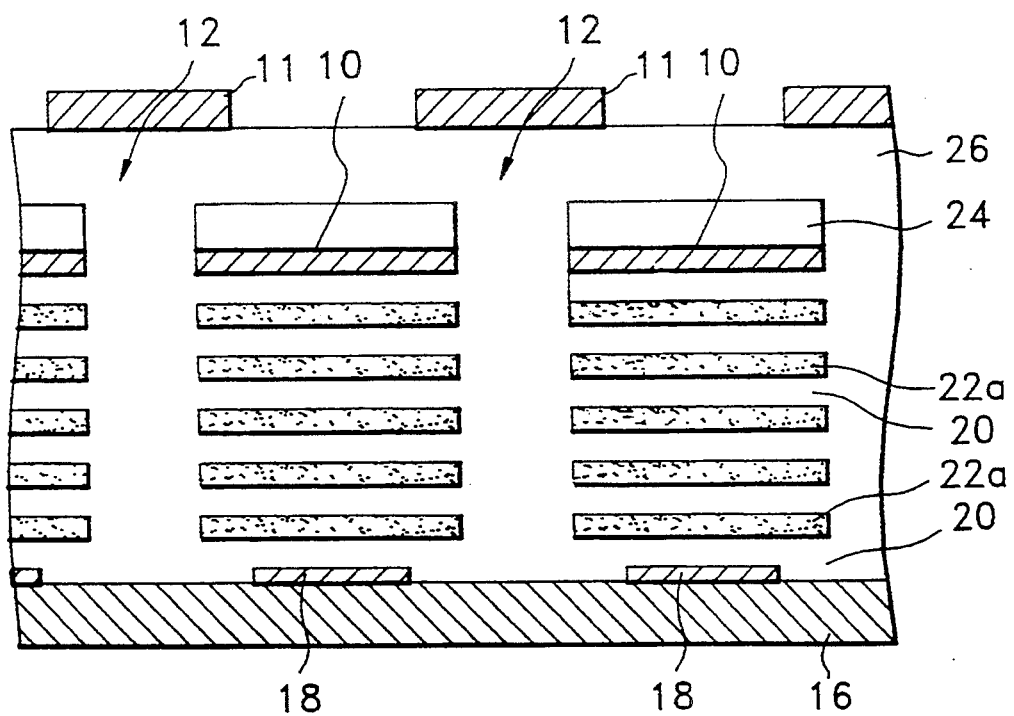
Figure 9:
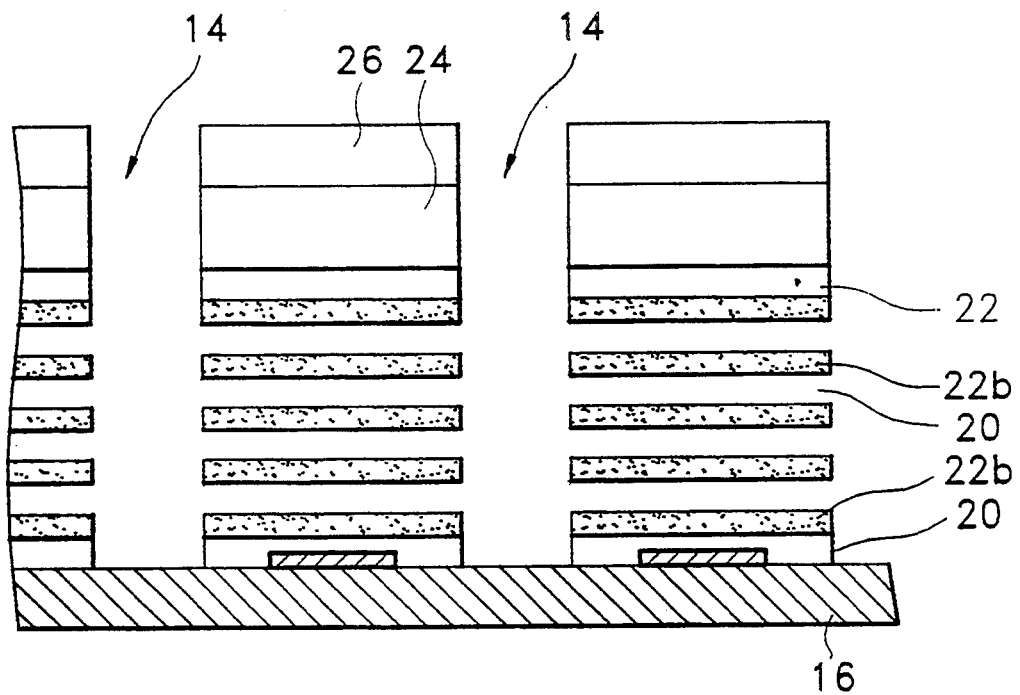
Figure 10:
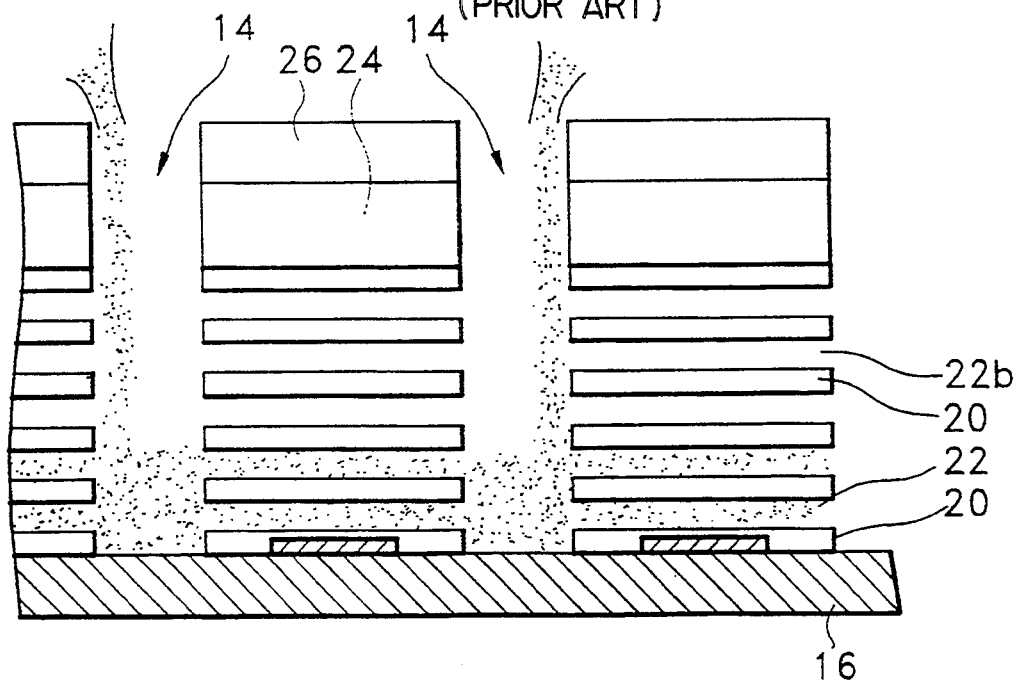
Figure 11:
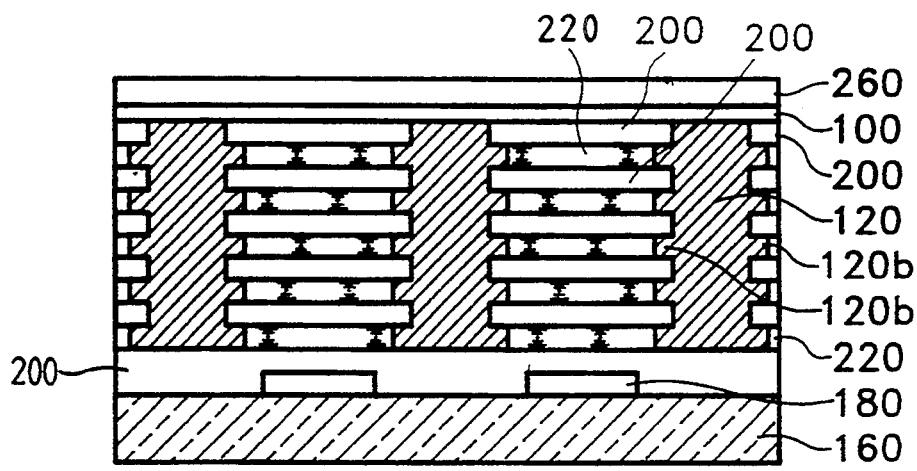
FIG. 11 is a schematic sectional view of the liquid crystal display device according to an embodiment of the present invention.

Referring to FIG. 11, the liquid crystal display device according to the present invention has a similar structure to that previously disclosed and shown in FIG. 2. Also, the inner walls of the columns of the LCD are formed so as to be uneven.

First, as to the overall structure of the LCD, first electrodes 180 which are composed of an indium tin oxide (ITO) are formed into a predetermined striped pattern on the surface of a black substrate 160 composed of an epoxy resin. Next, a light-controlling layer wherein insulation layers 200, e.g., epoxy resin, and liquid crystal layers 220 are alternately deposited a number of times, is formed above the first electrodes 180. Also, light-transmitting second electrodes 100 which are also composed of ITO are formed into a predetermined striped pattern with respect to first electrodes 180, on the surface of a topmost insulation layer 200. Further, a light-transmitting resin layer 260 comprised of the epoxy resin or an acrylic resin is uniformly formed on second electrodes 100. Here, first and second electrodes are arranged as an X-Y matrix-type structure. Insulation layers 200 are fixed in place by columns 120, as shown in FIG. 11.

On the other hand, insulation layers 200 have a plurality of liquid crystal inlet holes (not shown) outside the light-transmitting area. Liquid crystal inlet holes are linearly formed from light-transmitting resin layer 260 to bottommost insulation layer 200, and are sealed off after the filling of liquid crystal.

In the above-described structure, columns 120 bear the most characteristic feature of the present invention. That is, protrusions which constitute steps on the outer walls of the columns, as shown, are for increasing the contact area between insulation layers and columns, and they extend between upper and lower insulation layers at each level where the liquid crystal layers correspond. They strengthen the contact strength between the columns and the neighboring insulation layers, which is a very important function. For this reason, the insulation layers and columns can avoid becoming separated from each other. The protrusions can be formed of a different material as that the columns. However, it is most preferable for the protrusions to become comprised of the same material as the columns.

Liquid crystal layers 220 can be made of a field effect type liquid crystal, e.g., nematic liquid crystal or cholesteric nematic transition liquid crystal, the particles of which, depending upon the application of an electrical field, either become aligned such that light is allowed to pass through or fall back to a random arrangement to disperse incident light and thereby block light transmission. Here, if the electrical field is not applied, a blurred state is obtained which obstructs light transmission. The degree of this blurriness of the liquid crystal varies according to the disorder in the liquid crystal arrangement, i.e., their nonalignment.

The method for manufacturing the liquid crystal display device will be described, hereinafter, with reference to FIGS. 12 through 18.

FIGS. 12 through 18 show each step for manufacturing the reflective-type liquid crystal display device of FIG. 11, in sequence.

Figure 12:
FIGS. 12 through 18 show each step for manufacturing the reflective liquid crystal display device according to an embodiment of the present invention.

Referring to FIG. 12, first electrodes 180 being composed of a conductive material are formed into a predetermined striped pattern on the surface of a black substrate 160.

Figure 13:
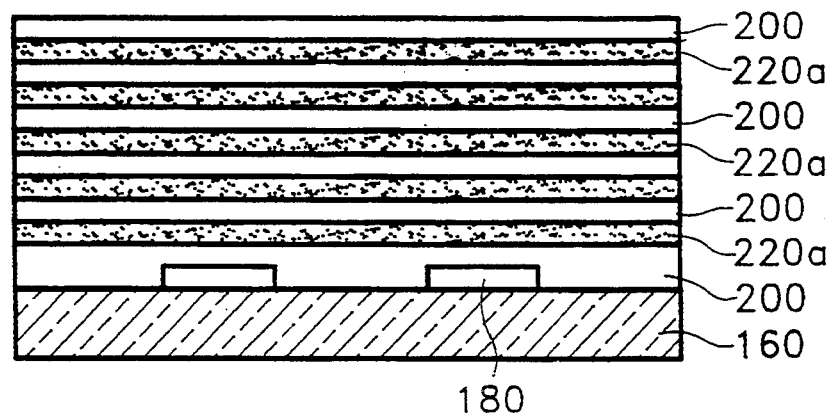

Referring to FIG. 13, on and around first electrodes 180, a material which is insoluble in a predetermined solvent and is stable even at temperatures above 180° C., for example, acrylic resin, polyimide or epoxy resin, is deposited to a thickness of 500 Å–20,000 Å to thereby form a light-transmitting insulation layer 200, on which a dissolution layer 220a comprised of polyvinyl alcohol (PVA) or polyimide which can be dissolved in the predetermined solvent, is formed. These two layers are alternately deposited at least five times. Here, the deposition can be performed by a spin coating method or roll coating method, and its thickness should be 1,000–5,000 Å.

Figure 14:
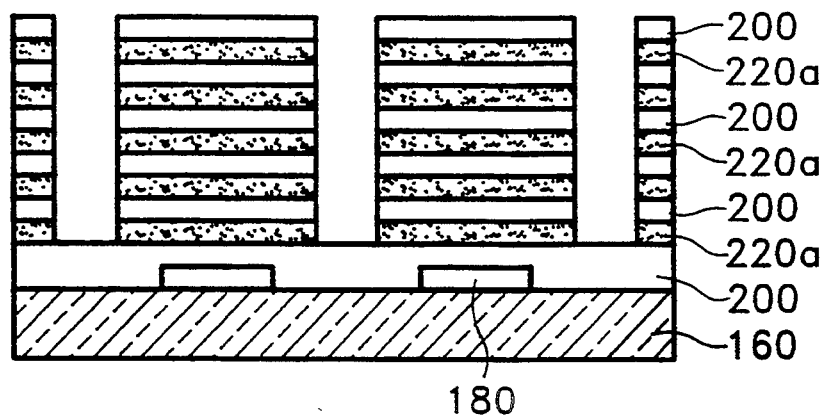
Figure 15:
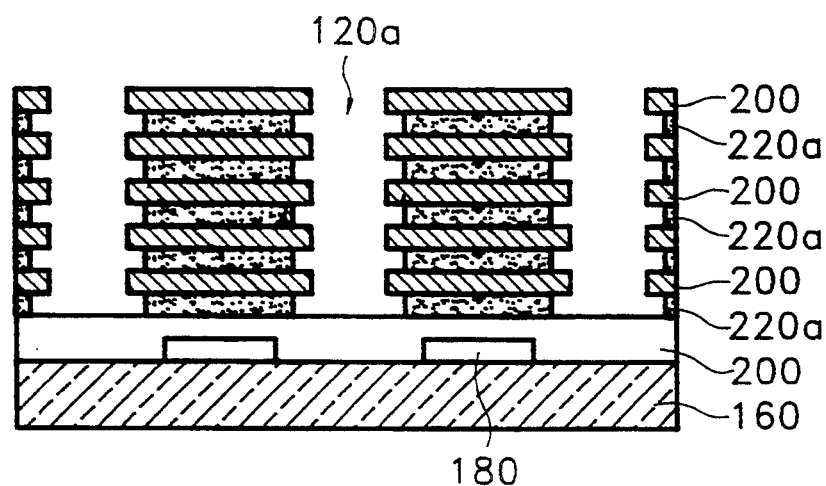

Referring to FIGS. 14 and 15 wells 120a for columns are formed from the topmost layer to the bottommost dissolution layer. At this time, a photoresist pattern for use in etching is formed by a photolithography method to thereby expose the portions where wells 120a for columns are to be formed. Next, wells 120a are formed by means of a reactive ion-etching method. Here, after the completion of the wells, the photoresist that has been used in etching is removed.

Referring to FIG. 15, an etchant is injected into wells 120a, to thereby remove the nearby portions of dissolution layers 220a. Therefore, the inner walls of wells 120a have an uneven formation.

Figure 16:
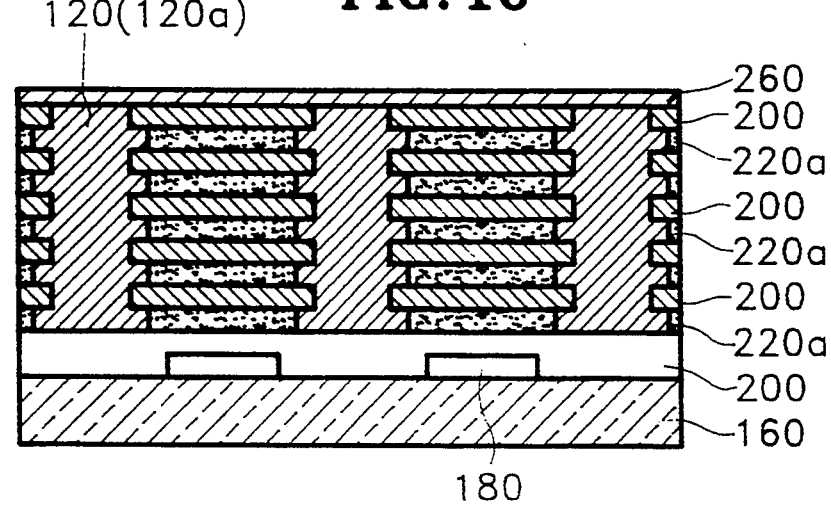

Referring to FIG. 16, uneven wells 120a are filled up with the epoxy resin and the exposed surface is coated with the same. Therefore, columns 120 and surface light-transmitting resin layer 260 are formed.

Figure 17:
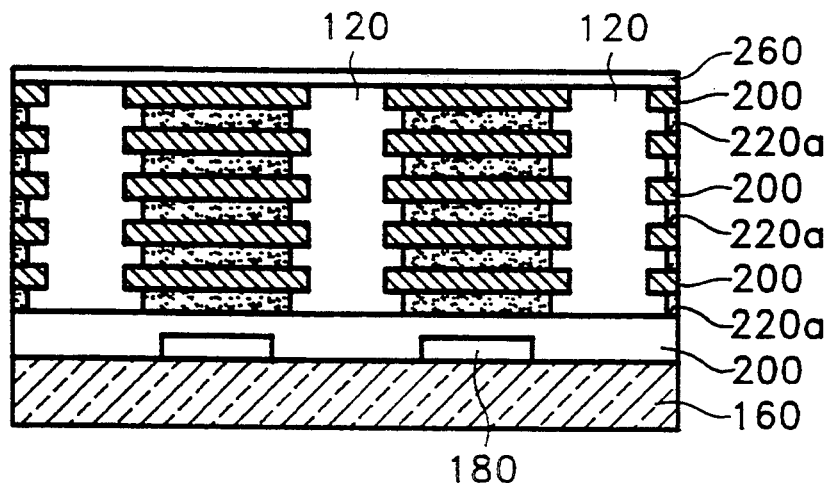

Referring to FIG. 17, on the surface of the topmost insulation layers 200, a plurality of second electrodes 100 comprised of ITO are formed into parallel stripes crossing first electrodes 180.

Figure 18:
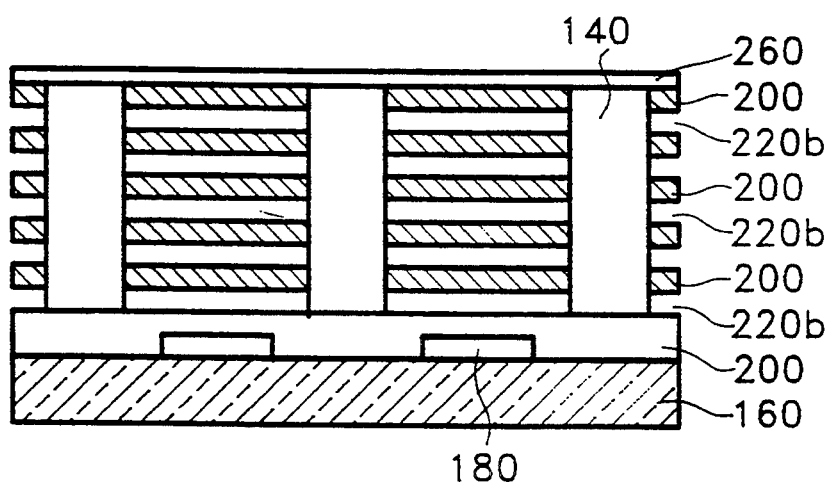

Referring to FIG. 18, liquid crystal inlet holes 140 are formed deeply by means of a photomask pattern and plasma etching, where columns 120 are not formed besides the light-transmitting portions. Here, a solvent, for example, a hydrochloric acid is supplied through inlet holes 140, to thereby dissolve and remove dissolution layers 220a. Accordingly, the portions where inlet holes 140 and dissolution layers are positioned turn into cavities 220b. Insulation layers 200 partitioning the cavities are kept in place by columns 120 at a predetermined interval with respect to one another.

The above partially manufactured product is dried and then, under vacuum, is supplied with liquid crystal via inlet holes 140, so that the liquid crystal layers 220 are formed between insulation layers 200. Upon the completion of the filling of liquid crystal, epoxy resin is coated on the entire exposed surface so that inlet holes 140 are sealed off. Next, necessary steps are performed so that a liquid crystal display device as shown in FIG. 11 is ultimately obtained.

By the above liquid crystal display device and the manufacturing method therefor, columns can most effectively be formed for strengthening the contact between columns and insulation layers, which accordingly prevents their separation. Therefore, stable insulation layers can be obtained.

What is claimed is:

1. A liquid crystal display device comprising:
   at least one substrate;
   a plurality of first electrodes arranged on said substrate into a predetermined pattern for constituting a plurality of pixels;
   a plurality of second electrodes oppositely arranged across from said first electrode by a predetermined interval therebetween;
   liquid crystal layers filling the gap between said first and second electrodes;
   a plurality of insulation layers arranged between said liquid crystal layers for separating said liquid crystal layers into a multiple lamination structure;
   columns having protrusions extending between the upper and lower insulation layers at each vertical level for securing said insulation layer within said liquid crystal layer; and
   protective insulation layers for protecting said first and second electrodes.

2. A liquid crystal display device as claimed in claim 1, wherein the protrusions on the walls of said columns and said columns themselves are integrally formed.

3. A method for manufacturing a liquid crystal display device, comprising the steps of:
   depositing a conductive material on a substrate to thereby form a plurality of first electrodes into a predetermined pattern;
   alternately depositing a predetermined number of times an insulation layer which is insoluble in a predetermined solvent and a dissolution layer which is soluble in the predetermined solvent, on said first electrodes;
   forming wells for columns extending from the top of the laminated structure to the dissolution layer of the bottom;

injecting an etchant through said wells for forming columns and removing parts of said dissolution layers near said wells, to thereby form the wells so as to have uneven inner walls;

filling said uneven wells for columns with an epoxy resin to thereby form columns;

forming on the surface of the topmost insulation layer a plurality of second electrodes corresponding to said first electrodes;

forming liquid crystal inlet holes where said columns are not formed;

providing said liquid crystal inlet holes with a solvent to thereby dissolve and remove said dissolution layers; and removing said dissolution layers and filling the thus-formed cavities with liquid crystal.

4. A method for manufacturing a liquid crystal display device as claimed in claim 3, wherein said step for forming the second electrodes with respect to said first electrodes is performed after said step for filling cavities with the liquid crystal.

5. A method for manufacturing a liquid crystal display device as claimed in claim 3, wherein said step for forming the second electrodes with respect to said first electrodes is performed prior to said step for forming liquid crystal inlet holes.

* * * * *